United States Patent
Sohn et al.

(10) Patent No.: US 9,071,392 B2
(45) Date of Patent: Jun. 30, 2015

(54) DEVICE FOR GENERATING RANGING SIGNAL OF WIRELESS COMMUNICATION SYSTEM AND METHOD OF GENERATING RANGING SIGNAL OF WIRELESS TERMINAL

(71) Applicant: Electronics and Telecommunications Research Institute, Daejeon (KR)

(72) Inventors: Kyung-Yeol Sohn, Daejeon-si (KR); Seung-Jae Bahng, Daejeon-si (KR); Youn-Ok Park, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 116 days.

(21) Appl. No.: 14/048,605

(22) Filed: Oct. 8, 2013

(65) Prior Publication Data
US 2014/0160917 A1    Jun. 12, 2014

(30) Foreign Application Priority Data
Dec. 11, 2012   (KR) .................... 10-2012-0143800

(51) Int. Cl.
 *H04J 11/00*    (2006.01)
 *H04L 5/00*    (2006.01)
(52) U.S. Cl.
 CPC ............... *H04L 5/0007* (2013.01); *Y02B 60/50* (2013.01)

(58) Field of Classification Search
 None
 See application file for complete search history.

(56) References Cited

U.S. PATENT DOCUMENTS

| | | | |
|---|---|---|---|
| 8,059,525 B2 * | 11/2011 | Koo et al. | 370/208 |
| 2009/0147874 A1 | 6/2009 | Huh | |
| 2010/0111017 A1 * | 5/2010 | Um et al. | 370/329 |
| 2010/0150100 A1 * | 6/2010 | Chen et al. | 370/330 |

FOREIGN PATENT DOCUMENTS

| | | |
|---|---|---|
| KR | 10-2009-0059315 A | 6/2009 |
| KR | 10-2012-0071920 A | 7/2012 |

* cited by examiner

*Primary Examiner* — Frank Duong
(74) *Attorney, Agent, or Firm* — Rabin & Berdo, P.C.

(57) ABSTRACT

There are provided a method of generating a ranging signal of a wireless terminal and a device for generating a ranging signal of a wireless communication system that can generate the ranging signal using one IFFT engine independently from a mode of the ranging signal transmitted in uplink in a wireless communication system in which a frequency interval of subcarriers used to generate an initial ranging signal and a frequency interval of subcarriers using periodic ranging are different. In this way, it is possible to decrease complexity of hardware and design of the wireless terminal, and decrease power consumption of the wireless terminal through hardware simplification.

7 Claims, 6 Drawing Sheets

DEVICE FOR GENERATING RANGING SIGNAL OF WIRELESS COMMUNICATION SYSTEM AND METHOD OF GENERATING RANGING SIGNAL OF WIRELESS TERMINAL

CROSS-REFERENCE TO RELATED APPLICATION

This application claims priority from Korean Patent Application No. 10-2012-0143800, filed on Dec. 11, 2012, in the Korean Intellectual Property Office, the entire disclosure of which is incorporated herein by reference for all purposes.

BACKGROUND

1. Field

The following description relates to ranging signal generation technology, and more particularly, to a method of generating a ranging signal of a wireless terminal and a device for generating a ranging signal of a wireless communication system that can generate the ranging is signal using one IFFT engine independently from a mode of the ranging signal transmitted in uplink in the wireless communication system in which a frequency interval of subcarriers used to generate an initial ranging signal and a frequency interval of subcarriers using periodic ranging are different.

2. Description of the Related Art

In general, communication systems have been mainly developed in voice services, and are being developed toward communication systems capable of supporting data services and a variety of multimedia services in addition to the voice services. Voice centered communication systems have a relatively small transmission bandwidth and require expensive usage fees so that it is difficult to meet increasing service needs from users.

Due to development of communication technology and increasing user needs for Internet services, communication systems capable of efficiently providing Internet services are increasingly required. Therefore, a broadband wireless communication system is introduced to provide efficient Internet services.

An orthogonal frequency division modulation access (OFDMA) method, which is a type of broadband wireless communication system method, converts a high speed data signal to a low speed data signal, and transmits and receives data through sub-channels including a plurality of subcarriers.

In the OFDMA method, downlink refers to simultaneously transmit signals to a plurality of users from a base station. Each user data signal is allocated to a plurality of sub-channels and the signal is transmitted as a downlink signal. In this case, all sub-subcarriers of signals transmitted from the base station have the same time delay and arrive in each user terminal at the is same time so that orthogonality between the sub-subcarriers is maintained and high speed data transmission is possible.

However, in uplink, due to independent propagation delay time and a relative location difference among user terminals, absolute time synchronization does not match between data signals arrived at the base station from user terminals so that the orthogonality is likely to be destroyed between the sub-subcarriers.

Accordingly, when the absolute time synchronization between uplink signals transmitted from user terminals does not match, signal orthogonality between subcarriers transmitted from a plurality of user terminals is destroyed and it is difficult to restore corresponding data in demodulation of signals received from the base station, thereby causing a serious data signal loss.

In order to address the above-described problems, the base station measures time errors based on a ranging signal transmitted from each user terminal through a uplink ranging procedure and informs the user terminal of the result. Therefore, the user terminal allows signals to be transmitted in accordance with reference time of the base station, thereby compensating propagation time errors between the user terminals.

In order to measure uplink time errors between the user terminal and the base station, each user terminal generates a random ranging code and transmits the code to the base station through a ranging channel. The signal received in the base station through the ranging channel shows a form of phase modulated signal having independent time delay.

The base station calculates correlation values between all random ranging codes provided from user terminals and ranging codes generated from the base station and finds a maximum value exceeding an arbitrary threshold value so that procedures for calculating time errors of each user terminal with respect to the reference time of the base station and finding a corresponding ranging code are performed.

Conventionally, since an initial ranging signal and a periodic ranging signal have the different number of OFDMA symbols used to transmit signals but have the same frequency interval of subcarriers, the same size of an inverse fast Fourier transform (IFFT) engine is used. Unlike conventional methods, a ranging signal generation method based on 802.16 m has a problem in that it is difficult to use with the same size of an FFT engine due to a difference between a frequency interval of subcarriers used to generate an initial ranging signal and a frequency interval of subcarriers using periodic ranging.

Technology disclosed in Korean Patent Application Publication No. 10-2012-0071920 (Jul. 3, 2012) processes signals of an initial ranging channel and a data channel using the same size of an FFT engine in a wireless communication system in which a frequency interval of subcarriers used to generate an initial ranging signal and a frequency interval of subcarriers using periodic ranging are different.

However, when a plurality of FFT engines having the same size are used, an appearance of a wireless terminal held by a user increases and power consumption increases due to complicated hardware.

Accordingly, the inventors studied technology that can generate a ranging signal using one IFFT engine independently from a mode of the ranging signal transmitted in uplink in a wireless communication system in which a frequency interval of subcarriers used to generate an initial ranging signal and a frequency interval of subcarriers using periodic ranging are different.

SUMMARY

The following description relates to a method of generating a ranging signal of a wireless terminal and a device for generating a ranging signal of a wireless communication system that can generate the ranging signal using one IFFT engine independently from a mode of is the ranging signal transmitted in uplink in a wireless communication system in which a frequency interval of subcarriers used to generate an initial ranging signal and a frequency interval of subcarriers using periodic ranging are different.

In one general aspect, a device for generating a ranging signal of a wireless communication system includes an inverse fast Fourier transformer configured to perform inverse fast Fourier transform (IFFT) of a frequency-domain signal having a periodic ranging signal length into a time-domain signal independently from a ranging mode, a demultiplexer configured to distribute the time-domain signal having a periodic ranging signal length transformed by the inverse fast Fourier transformer based on the set ranging mode, an initial ranging signal generator configured to generate an initial ranging signal from the time-domain signal having a periodic ranging signal length distributed by the demultiplexer when the ranging mode is set to an initial ranging mode, and a multiplexer configured to multiplex the initial ranging signal generated by the initial ranging signal generator when the ranging mode is set to an initial ranging mode or the time-domain signal having a periodic ranging signal length distributed by the demultiplexer when the ranging mode is set to a periodic ranging mode and output the results.

The initial ranging signal generator may include a zero padder that inserts at least one '0' in the time-domain signal having a periodic ranging signal length distributed by the demultiplexer, a linear interpolator that performs linear interpolation of the signal output from the zero padder, and a frequency shifter that performs frequency shift of the signal linear interpolated by the linear interpolator to a subcarrier signal band allocated for transmitting the ranging signal.

The ranging signal generating device may further include a mode selector configured to set an initial ranging mode or a periodic ranging mode.

The ranging signal generating device may further include a signal generator configured to generate a frequency-domain signal having a periodic ranging signal length input to the inverse fast Fourier transformer.

In another aspect, a method of generating a ranging signal of a wireless terminal includes inverse fast Fourier transforming (IFFT) a frequency-domain signal having a periodic ranging signal length into a time-domain signal independently from a ranging mode, demultiplexing the time-domain signal having a periodic ranging signal length transformed in the inverse fast Fourier transforming based on the set ranging mode, generating an initial ranging signal from the time-domain signal having a periodic ranging signal length distributed in the demultiplexing when the ranging mode is set to an initial ranging mode, and multiplexing the initial ranging signal generated in the generating of the initial ranging signal when the ranging mode is set to an initial ranging mode or the time-domain signal having a periodic ranging signal length distributed in the demultiplexing when the ranging mode is set to a periodic ranging mode, and outputting the results.

The generating of the initial ranging signal may include inserting at least one '0' into the time-domain signal having a periodic ranging signal length distributed in the demultiplexing, performing linear interpolation of the signal into which at least one '0' is inserted in the inserting, and performing frequency shift of the signal linear interpolated in the performing of the linear interpolation to a subcarrier signal band allocated for transmitting the ranging signal.

The ranging signal generation method may further include selecting an initial ranging mode or a periodic ranging mode.

The ranging signal generation method may further include generating a frequency-domain signal having a periodic ranging signal length transformed in the inverse fast Fourier transforming.

According to the invention, the ranging signal is generated using one IFFT engine independently from a mode of the ranging signal transmitted in uplink in the wireless communication system in which a frequency interval of subcarriers used to generate an initial ranging signal and a frequency interval of subcarriers using periodic ranging are different. In this way, it is possible to decrease complexity of hardware and design of the wireless terminal, and decrease power consumption of the wireless terminal through hardware simplification.

Other features and aspects will be apparent from the following detailed description, the drawings, and the claims.

Throughout the drawings and the detailed description, unless otherwise described, the is same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, in order to facilitate understanding and reproduce by those skilled in the art, the present invention will be described in detail by explaining exemplary embodiments with reference to the accompanying drawings.

When it is determined that detailed explanations of related well-known functions or configurations unnecessarily obscure gist of the embodiments, the detailed description thereof will not be repeated.

The terminology used herein is defined by considering a function in the embodiments, and meanings may vary depending on, for example, a user or operator's intentions or customs. Therefore, the meanings of terms used in the embodiments should be interpreted based on the scope throughout this specification.

While the embodiments of the invention describe generation of an initial ranging signal and a periodic ranging signal in a wireless communication system (for example, a wireless communication system based on 802.16 m) in which a frequency interval of subcarriers of an initial ranging channel and a frequency interval of subcarriers of a periodic ranging signal are different, and the invention is not limited thereto but can be applied to a case in which a periodic ranging signal and a data signal are simultaneously transmitted.

Figure 1:
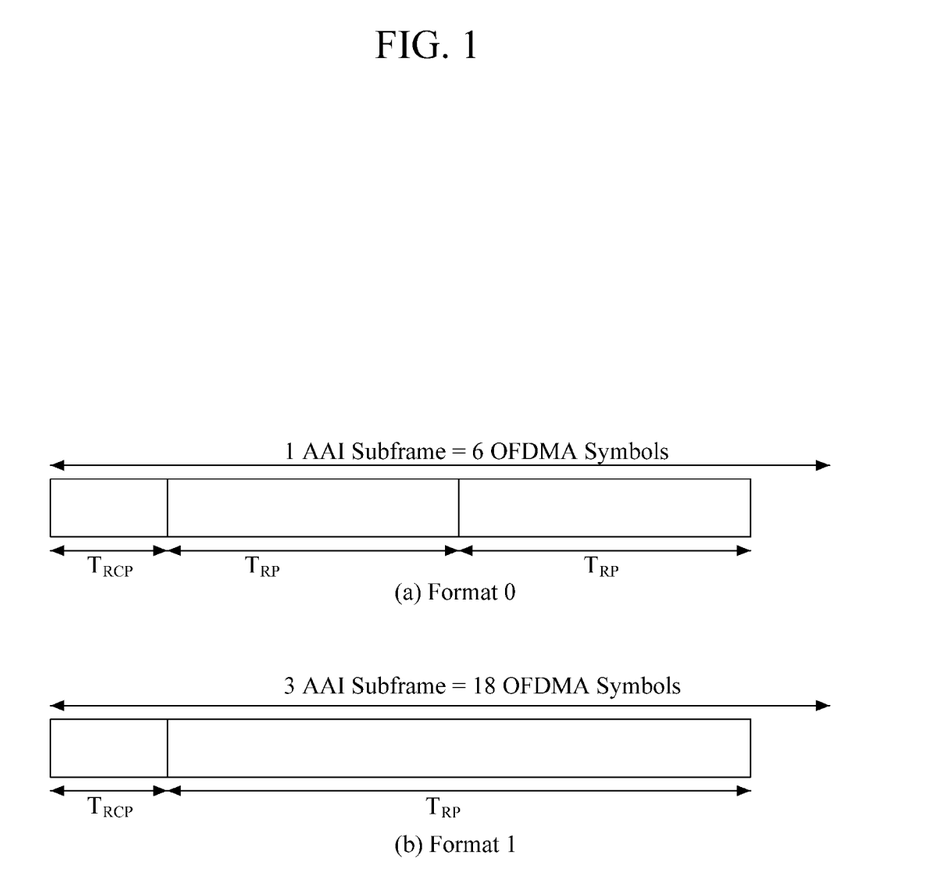
FIG. 1 is a diagram illustrating a structure of a frame of an initial ranging signal transmitted in uplink.

FIG. 1 is a diagram illustrating a structure of a frame of an initial ranging signal transmitted in uplink. As illustrated in FIG. 1, the frame of the initial ranging signal transmitted in uplink (transmission from a wireless terminal held by a user to a base station of a wireless communication system) has two formats (Format 0 and Format 1) having the same structure depending on purposes. The frame structure of the initial ranging signal includes an initial ranging symbol section (TRP) and an initial ranging cyclic prefix section (TRCP) is positioned before the initial ranging symbol section.

Figure 2:
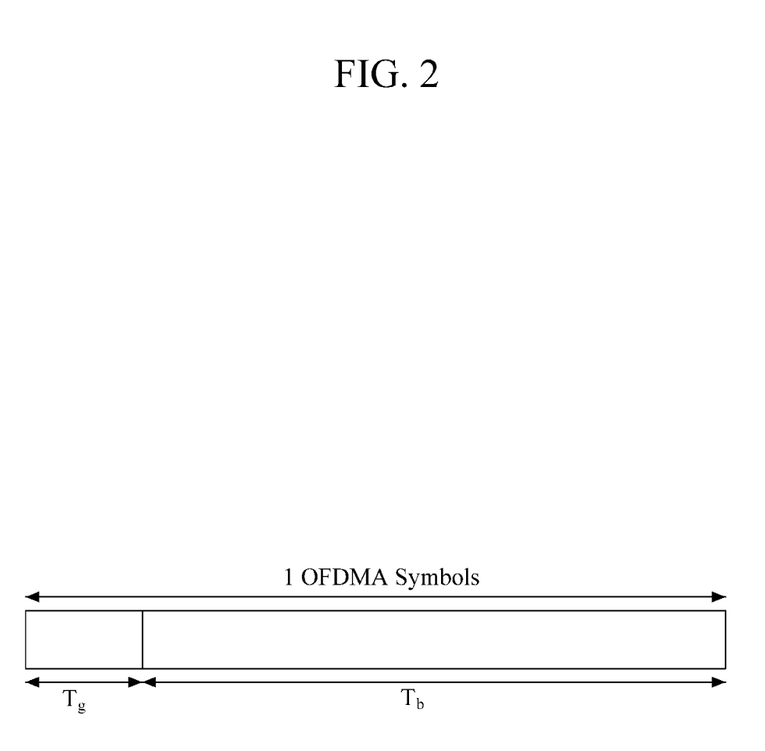
FIG. 2 is a diagram illustrating a structure of a frame of a periodic ranging signal transmitted in uplink.

FIG. 2 is a diagram illustrating a structure of a frame of a periodic ranging signal transmitted in uplink. The frame structure of the periodic ranging signal includes a data symbol section (Tb) and a data cyclic prefix section (Tg) is positioned before the data symbol section.

Table 1 represents two formats of the initial ranging signal transmitted in uplink depending on purposes, where Tb is a data symbol section, Tg is a data cyclic prefix section, k1 is (Nsym+1)/2, k2 is (Nsym−4)/2, and Nsym is the number of OFDMA symbols configuring a subframe.

TABLE 1

| Format No | TRCP | TRP | ΔfRP |
|---|---|---|---|
| 0 | k1 × Tg + k2 × Tb | 2 × Tb | Δf/2 |
| 1 | 3.5 × Tg + 7 × Tb | 8 × Tb | Δf/8 |

A frequency interval (Δf/2 or Δf/8) of subcarriers of the initial ranging signal transmitted in uplink from the wireless terminal held by the user to the base station and a frequency interval (Δf) of subcarriers of the periodic ranging signal are different. That is, when the frequency interval of subcarriers of the initial ranging signal is set to Δf/2 or Δf/8, it has 0.5 times or 0.125 times of the frequency interval than that of subcarriers of the periodic ranging signal. This means that a size of an IFFT engine used for OFDM modulation of the ranging signal is different.

Figure 3:
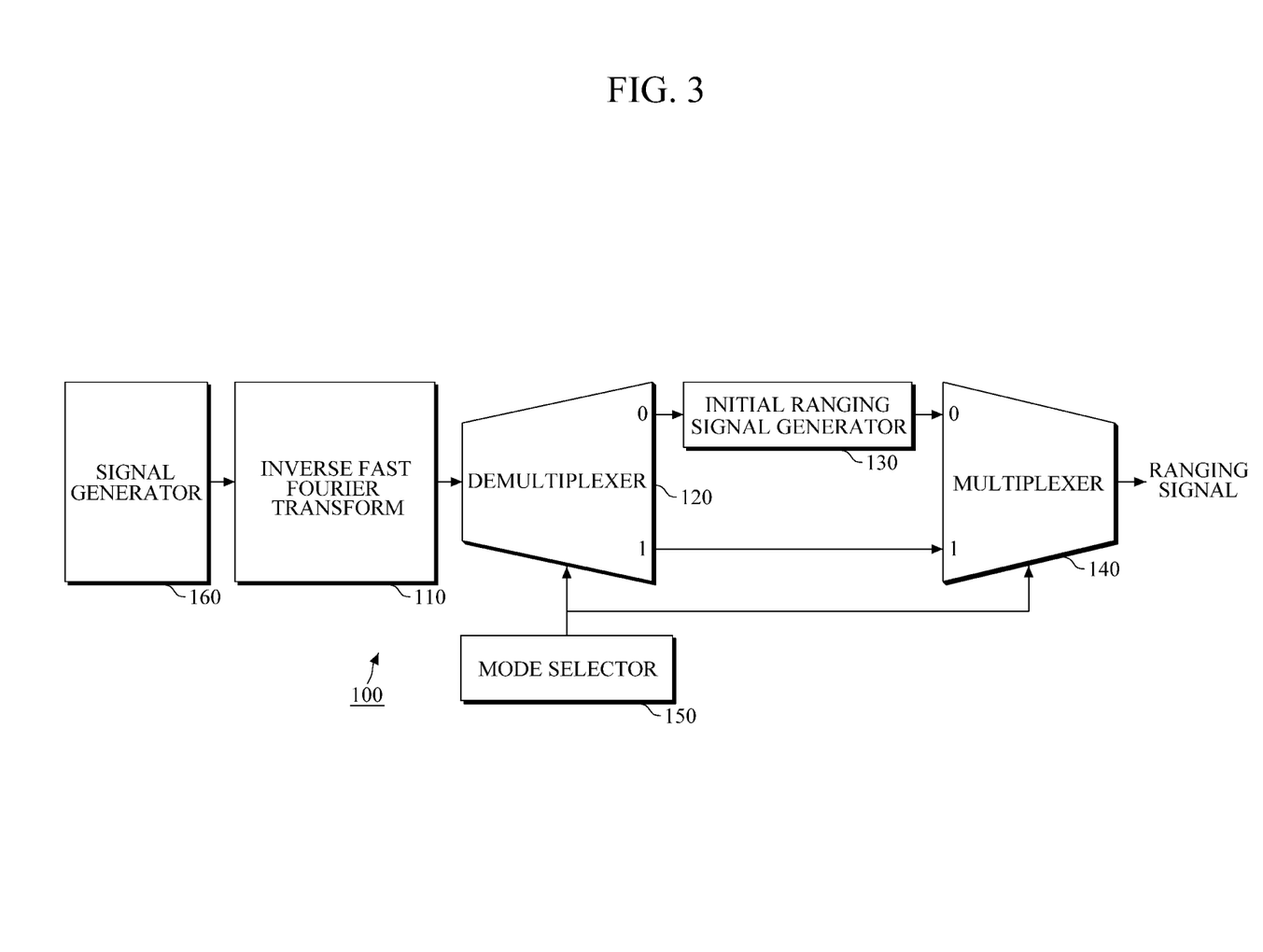
FIG. 3 is a block diagram illustrating a configuration of a ranging signal generating device of a wireless communication system according to an embodiment of the invention.

The invention proposes a ranging signal generating device that generates a ranging signal using one IFFT engine independently from a mode of the ranging signal transmitted in uplink in a wireless communication system in which a frequency interval of subcarriers used to generate an initial ranging signal and a frequency interval of subcarriers using periodic ranging are different, as illustrated in FIG. 3.

FIG. 3 is a block diagram illustrating a configuration of the ranging signal generating device of the wireless communication system according to an embodiment of the invention. As illustrated in FIG. 3, a ranging signal generating device 100 of the wireless communication system according to the embodiment is mounted on the wireless terminal held by the user and includes an inverse fast Fourier transformer 110, a demultiplexer 120, an initial ranging signal generator 130, and a multiplexer 140.

The inverse fast Fourier transformer 110 performs inverse fast Fourier transform (IFFT) of a frequency-domain signal having a periodic ranging signal length into a time-domain signal, independently from a ranging mode.

As described in Table 1, the length of the initial ranging signal is relatively longer than that of the periodic ranging signal. According to the invention, the initial ranging signal and the periodic ranging signal are generated from the frequency-domain signal having a periodic ranging signal length using one IFFT engine, that is, the inverse fast Fourier transformer 110.

For this purpose, inverse fast Fourier transform (IFFT) of the frequency-domain signal having a periodic ranging signal length into the time-domain signal is performed using the inverse fast Fourier transformer 110 independently from a ranging mode.

The demultiplexer 120 distributes the time-domain signal having a periodic ranging signal length transformed by the inverse fast Fourier transformer 110 based on the set ranging mode. That is, the demultiplexer 120 delivers the inverse fast Fourier transformed signal to the initial ranging signal generator 130 when the ranging mode is set to an initial ranging mode.

Moreover, the demultiplexer 120 performs frequency shift of the inverse fast Fourier transformed signal to a subcarrier signal band allocated for transmitting the ranging signal and directly delivers the signal to the multiplexer 140 when the ranging mode is set to a periodic ranging mode.

Figure 4:
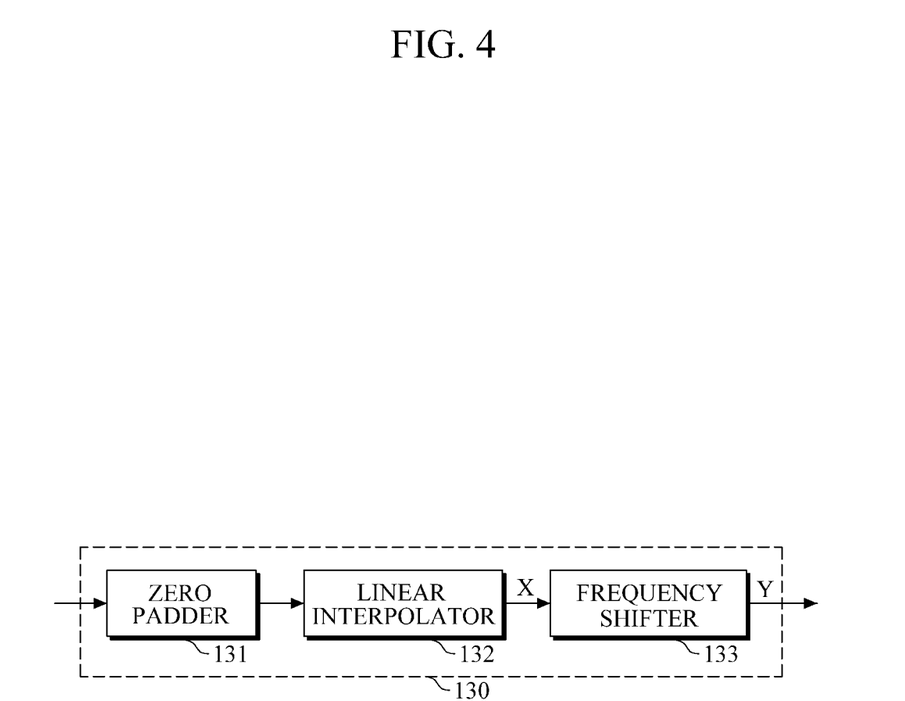
FIG. 4 is a block diagram illustrating a configuration of an initial ranging signal generator of the wireless communication system according to the embodiment of the invention.

When the ranging mode is set to an initial ranging mode, the initial ranging signal generator 130 generates an initial ranging signal from the time-domain signal having a periodic ranging signal length distributed by the demultiplexer 120. In this case, as illustrated in FIG. 4, the initial ranging signal generator 130 may be configured to include a zero padder 131, a linear interpolator 132, and a frequency shifter 133. FIG. 4 is a block diagram illustrating a configuration of the initial ranging signal generator of the wireless communication system according to the embodiment of the invention.

Figure 5:
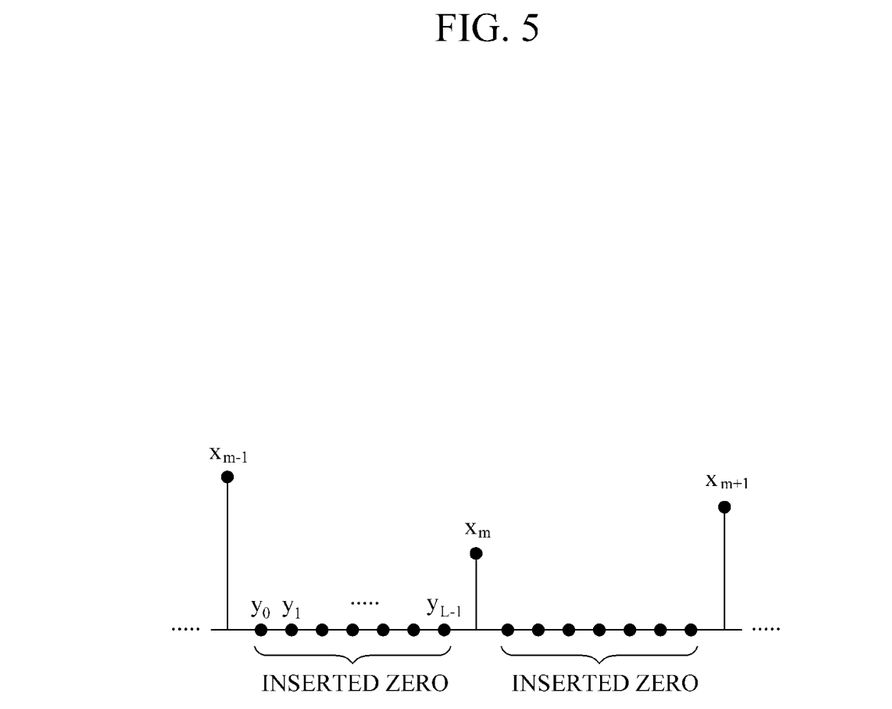
FIG. 5 is a diagram illustrating an example in which zeros are inserted using a zero padder of the initial ranging signal generator of the wireless communication system according to the invention.

The zero padder 131 inserts at least one '0' in the time-domain signal having a periodic ranging signal length distributed by the demultiplexer 120. In this case, in Table 1, the number of zeros inserted by the zero padder 131 is 1 when a type of the initial ranging signal is 'Format 0', and is 7 in 'Format 1.' Accordingly, signals are respectively transformed to the signals having two times or eight times of length than that of input signals. FIG. 5 is a diagram illustrating an example in which zeros are inserted using the zero padder of the initial ranging signal generator of the wireless communication system according to the invention.

The linear interpolator 132 performs linear interpolation of the signal output from the zero padder 131.

Equation 1 is an example of a linear interpolation equation for linear interpolation. In Equation 1, xm and xm+1 represent signals output from the inverse fast Fourier transformer 110, yl is a value of a position at which '0' is inserted between xm and xm+1, and L has a value of 2 when a type of the initial ranging signal is 'Format 0' and has a value of 8 in 'Format 1.'

$$y_l = x_m + \frac{l}{L} \times (x_{m+1} - x_m),$$

$$l = 0, \ldots, L - i$$

Equation 1

The frequency shifter 133 performs frequency shift of the signal linear interpolated by the linear interpolator 132 to a subcarrier signal band allocated for transmitting the ranging signal. Equation 2 is an example of a frequency shift equation for frequency shift.

In Equation 2, X represents signals input to the frequency shifter 133, fpos represents a position of subcarriers in which the initial ranging signal is allocated, and Y represents signals output from the frequency shifter 133. N represents a length of the signal input to the inverse fast Fourier transformer 110, and t represents a length of the initial ranging signal generated by the initial ranging signal generator 130 (that is, t=0~2*N in 'Format 0' and t=0~8*N in 'Format 1').

$Y = X \times (\cos(2\pi \cdot f_{pos} \cdot t/N) + j \sin(2\pi f_{pos} \cdot t/N))$   Equation 2

The multiplexer 140 multiplexes the initial ranging signal generated by the initial ranging signal generator 130 when the ranging mode is set to an initial ranging mode or the time-domain signal having a periodic ranging signal length distributed by the demultiplexer 120 when the ranging mode is set to a periodic ranging mode, and outputs the results.

The initial ranging signal or the periodic ranging signal output from the multiplexer 140 is transmitted from the wireless terminal to the base station using a ranging channel at the time of shared transmission between the wireless terminal held by the user and the base station. The base station measures time errors based on the ranging signal transmitted from each wireless terminal and informs each wireless terminal of the result so that time synchronization between the wireless terminal and the base station is performed.

Therefore, according to the invention described above, the ranging signal is generated using one IFFT engine independently from a mode of the ranging signal transmitted in uplink in the wireless communication system in which a frequency interval of subcarriers used to generate an initial ranging signal and a frequency interval of subcarriers using periodic ranging are different. In this way, it is possible to decrease complexity of hardware and design of the wireless terminal, and decrease power consumption of the wireless terminal through hardware simplification.

Moreover, the ranging signal generating device 100 of the wireless communication system may further include a mode selector 150. The mode selector 150 sets an initial ranging mode or a periodic ranging mode. For example, the initial ranging mode may be selected when the wireless terminal is initially connected to the current base station, and the periodic ranging mode may be selected before a new initial ranging mode is selected when the wireless terminal is connected to a new base station after the initial ranging mode is selected.

Then, according to the ranging mode set by the mode selector 150, when the ranging mode is set to an initial ranging signal, the demultiplexer 120 delivers the inverse fast Fourier transformed signal to the initial ranging signal generator 130. When the ranging mode is set to a periodic ranging mode, the demultiplexer 120 performs frequency shift of the inverse fast Fourier transformed signal to a subcarrier signal band allocated for transmitting the ranging signal and delivers the signal to the multiplexer 140.

Furthermore, the ranging signal generating device 100 of the wireless communication system may further include a signal generator 160. The signal generator 160 generates a frequency-domain signal having a periodic ranging signal length input to the inverse fast Fourier transformer 110.

Figure 6:
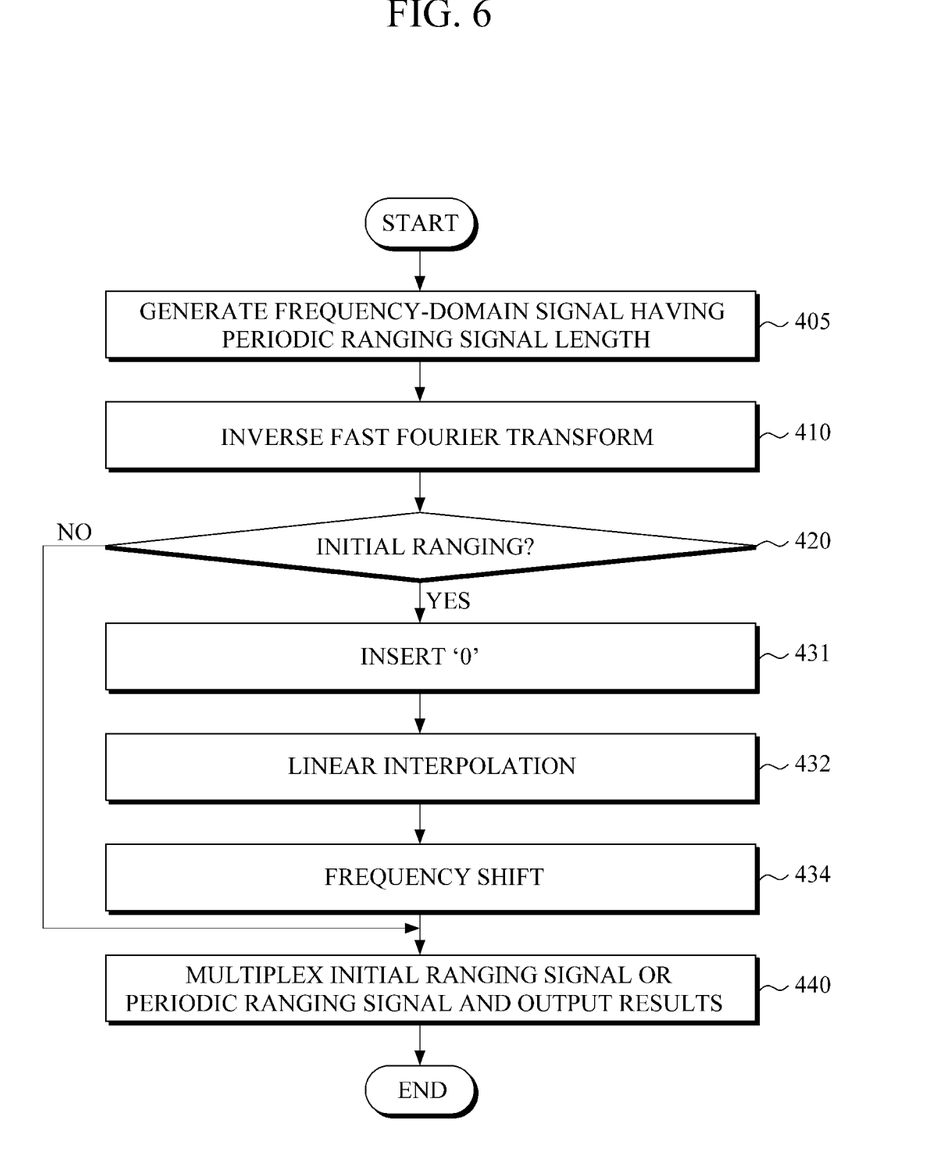
FIG. 6 is a flowchart illustrating operations of a ranging signal generation method of a wireless terminal according to the embodiment of the invention.

Ranging signal generating operations of the wireless terminal including the ranging signal generating device of the wireless communication system according to the invention described above will be described with reference to FIG. 6. FIG. 6 is a flowchart illustrating operations of a ranging signal generation method of the wireless terminal according to the embodiment of the invention.

First, in an inverse fast Fourier transforming operation 410, the wireless terminal performs inverse fast Fourier transform (IFFT) of a frequency-domain signal having a periodic ranging signal length into a time-domain signal independently from a ranging mode.

Then, in a demultiplexing operation 420, the wireless terminal distributes the time-domain signal having a periodic ranging signal length transformed in the inverse fast Fourier transforming operation 410 based on the set ranging mode.

When the ranging mode is set to an initial ranging mode, in an initial ranging signal generating operation 430, the wireless terminal generates an initial ranging signal from the time-domain signal having a periodic ranging signal length distributed in the demultiplexing operation 420. In this case, the initial ranging signal generating operation 430 may include a zero padding operation 431, a linear interpolation operation 432, and a frequency shift operation 433.

In the zero padding operation 431, at least one '0' is inserted into the time-domain signal having a periodic ranging signal length distributed in the demultiplexing operation 420. Since this has already been described, the detailed description thereof will not be repeated.

In the linear interpolation operation 432, linear interpolation is performed on the signal into which at least one '0' is inserted in the zero padding operation 431. Since this has already been described, the detailed description thereof will not be repeated.

In the frequency shift operation 433, frequency shift of the signal linear interpolated in the linear interpolation operation 432 to a subcarrier signal band allocated for transmitting the ranging signal is performed. Since this has already been described, the detailed description thereof will not be repeated.

Then, in a multiplexing operation 440, the wireless terminal multiplexes the initial ranging signal generated in the initial ranging signal generating operation 430 when the ranging mode is set to an initial ranging mode or the time-domain signal having a periodic ranging signal length distributed in the demultiplexing operation 420 when the ranging mode is set to a periodic ranging mode, that is, a periodic ranging signal, and outputs the results.

The initial ranging signal or the periodic ranging signal output from the multiplexing operation 440 is transmitted from the wireless terminal to the base station using a ranging channel at the time of shared transmission between the wireless terminal held by the user and the base station. The base station measures time errors based on the ranging signal transmitted from each wireless terminal and informs each wireless terminal of the result so that time synchronization between the wireless terminal and the base station is performed.

Therefore, according to the invention described above, a ranging signal is generated using one IFFT engine independently from a mode of the ranging signal transmitted in uplink in the wireless communication system in which a frequency interval of subcarriers used to generate an initial ranging signal and a frequency interval of subcarriers using periodic ranging are different. In this way, it is possible to decrease complexity of hardware and design of the wireless terminal, and decrease power consumption of the wireless terminal through hardware simplification.

Moreover, the ranging signal generation method of the wireless terminal may further include a signal generating operation 405. In the signal generating operation 405, the wireless terminal generates a frequency-domain signal having a periodic ranging signal length transformed in the inverse fast Fourier transforming operation 410.

Therefore, according to the invention described above, the ranging signal is generated using one IFFT engine independently from a mode of the ranging signal transmitted in uplink in the wireless communication system in which a frequency interval of subcarriers used to generate an initial ranging signal and a frequency interval of subcarriers using periodic ranging are different. In this way, it is possible to decrease complexity of hardware and design of the wireless terminal, and decrease power consumption of the wireless terminal through hardware simplification, thereby accomplishing the above-described purposes of the invention.

While exemplary embodiments of the invention have been particularly described in detail with reference to the accompanying drawings, it is apparent that various modifications may be made without departing from the spirit and scope of the invention as defined by the appended claims.

The present invention can be implemented as computer-readable codes in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for generating a ranging signal of a wireless communication system, comprising:
   an inverse fast Fourier transformer configured to perform inverse fast Fourier transform (IFFT) of a frequency-domain signal having a periodic ranging signal length into a time-domain signal independently from a ranging mode;
   a demultiplexer configured to distribute the time-domain signal having a periodic ranging signal length transformed by the inverse fast Fourier transformer based on the set ranging mode;
   an initial ranging signal generator configured to generate an initial ranging signal from the time-domain signal having a periodic ranging signal length distributed by the demultiplexer when the ranging mode is set to an initial ranging mode; and
   a multiplexer configured to multiplex the initial ranging signal generated by the initial is ranging signal generator when the ranging mode is set to an initial ranging mode or the time-domain signal having a periodic ranging signal length distributed by the demultiplexer when the ranging mode is set to a periodic ranging mode and output the results.

2. The device according to claim 1, wherein the initial ranging signal generator includes:
   a zero padder that inserts at least one '0' in the time-domain signal having a periodic ranging signal length distributed by the demultiplexer;
   a linear interpolator that performs linear interpolation of the signal output from the zero padder; and
   a frequency shifter that performs frequency shift of the signal linear interpolated by the linear interpolator to a subcarrier signal band allocated for transmitting the ranging signal.

3. The device according to claim 1, further comprising a mode selector configured to select an initial ranging mode or a periodic ranging mode.

4. The device according to claim 1, further comprising a signal generator configured to generate a frequency-domain signal having a periodic ranging signal length input to the inverse fast Fourier transformer.

5. A method of generating a ranging signal of a wireless terminal, comprising:
   inverse fast Fourier transforming (IFFT) a frequency-domain signal having a periodic ranging signal length into a time-domain signal independently from a ranging mode;
   demultiplexing the time-domain signal having a periodic ranging signal length is transformed in the inverse fast Fourier transforming based on the set ranging mode;
   generating an initial ranging signal from the time-domain signal having a periodic ranging signal length distributed in the demultiplexing when the ranging mode is set to an initial ranging mode; and
   multiplexing the initial ranging signal generated in the generating of the initial ranging signal when the ranging mode is set to an initial ranging mode or the time-domain signal having a periodic ranging signal length distributed in the demultiplexing when the ranging mode is set to a periodic ranging mode, and outputting the results.

6. The method according to claim 5, wherein the generating of the initial ranging signal includes:
   inserting at least one '0' into the time-domain signal having a periodic ranging signal length distributed in the demultiplexing;
   performing linear interpolation of the signal into which at least one '0' is inserted in the inserting; and
   performing frequency shift of the signal linear interpolated in the performing of the linear interpolation to a subcarrier signal band allocated for transmitting the ranging signal.

7. The method according to claim 5, further comprising generating a frequency-domain signal having a periodic ranging signal length transformed in the inverse fast Fourier transforming.

* * * * *